C. S. BERGQUIST.
POWER TRANSMISSION PULLEY.
APPLICATION FILED FEB. 15, 1917.

1,238,627.

Patented Aug. 28, 1917.
2 SHEETS—SHEET 1.

Inventor
Clarence S. Bergquist

By Lancaster and Allwine
his Attorneys

C. S. BERGQUIST.
POWER TRANSMISSION PULLEY.
APPLICATION FILED FEB. 15, 1917.
1,238,627.
Patented Aug. 28, 1917.
2 SHEETS—SHEET 2.
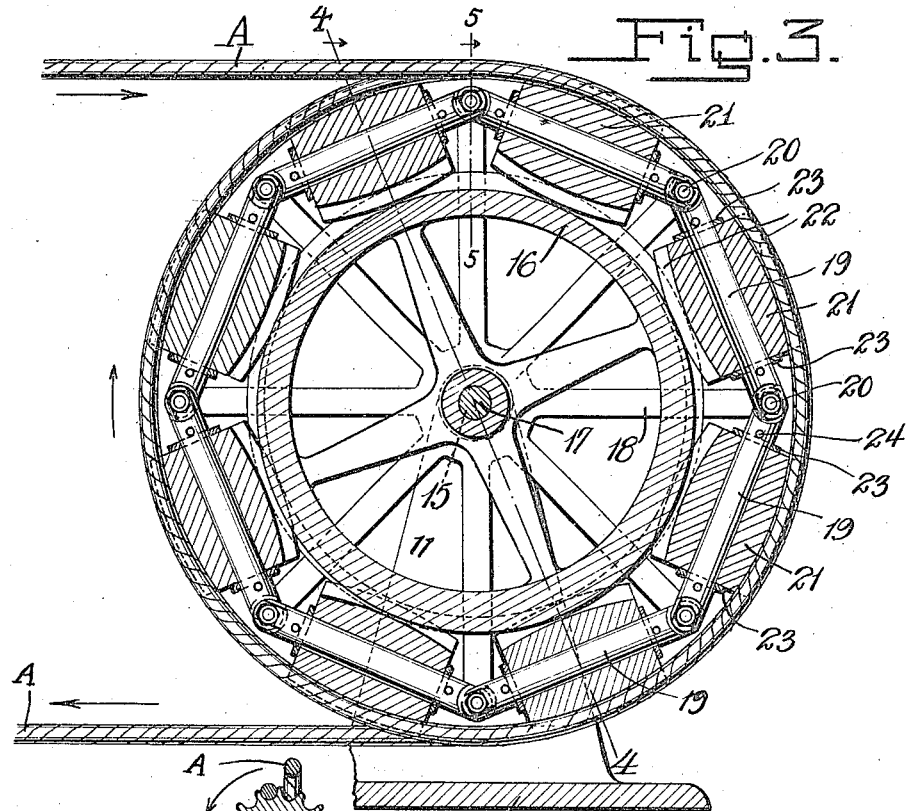
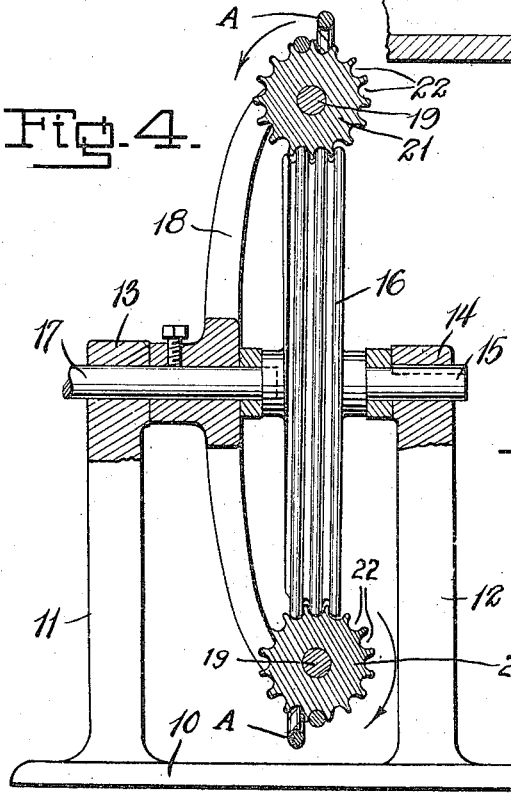
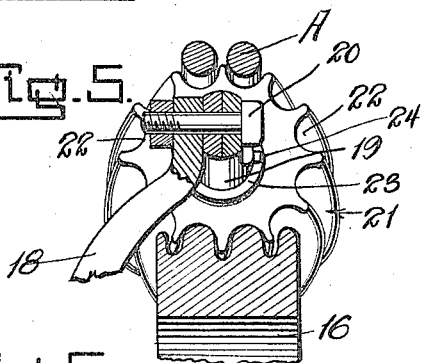
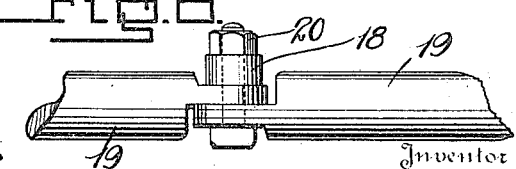
Inventor
Clarence S. Bergquist

UNITED STATES PATENT OFFICE.

CLARENCE S. BERGQUIST, OF SEATTLE, WASHINGTON.

POWER-TRANSMISSION PULLEY.

1,238,627.   Specification of Letters Patent.   Patented Aug. 28, 1917.

Application filed February 15, 1917. Serial No. 148,757.

*To all whom it may concern:*

Be it known that I, CLARENCE S. BERG-QUIST, a subject of the King of Great Britain and Ireland, and a resident of Seattle, in the county of King and State of Washington, have invented a certain new and useful Improvement in Power-Transmission Pulleys, of which the following is a specification.

The present invention relates to power transmission mechanism, and more particularly to pulleys and the like over which are adapted to be trained flexible connecting elements.

An object of the present invention is to provide a pulley of this character which is adapted to receive thereover a cable, a chain, a belt, or the like flexible connecting element, and which is of such construction as to increase the traction between the pulley and the flexible element to adapt the pulley to use where heavy loads are to be carried at a relatively slow rate of speed.

Another object of the present invention is to provide a pulley possessing the above characteristics, and which is of such construction that the same may be made relatively small with a relatively large traction or friction surface.

It is a further aim of the present invention to provide a pulley of this nature which comprises relatively few parts, which is strong and durable, and which may be economically manufactured.

The above, and various other objects and advantages of this invention will be in part understood, and in part described, in the following detailed description of the present preferred embodiment, the same being illustrated in the accompanying drawings wherein:

Fig. 3 is a transverse section of the same taken substantially centrally and at right angles to the axis of rotation of the pulley.

Fig. 4 is a transverse section on the line 4—4 of Fig. 3, showing the connection between the circumferentially arranged peripheral elements and the centrally disposed actuating means therefor.

Fig. 5 is a detail enlarged section on the line 5—5 of Fig. 3 showing the connection between the spider and the adjacent ends of a pair of the spindles.

Fig. 6 is a detail, enlarged, peripheral view of the same, the remote parts being broken away.

Figure 1:
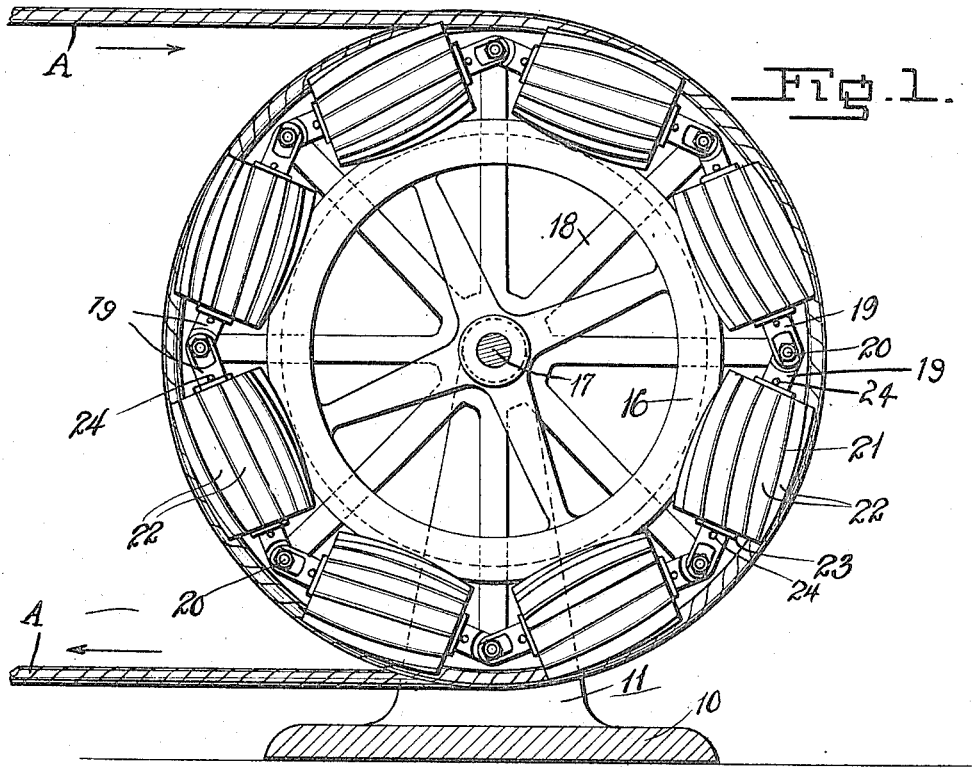
Figure 1 is a side elevation of a pulley constructed according to the present invention.
Figure 2:
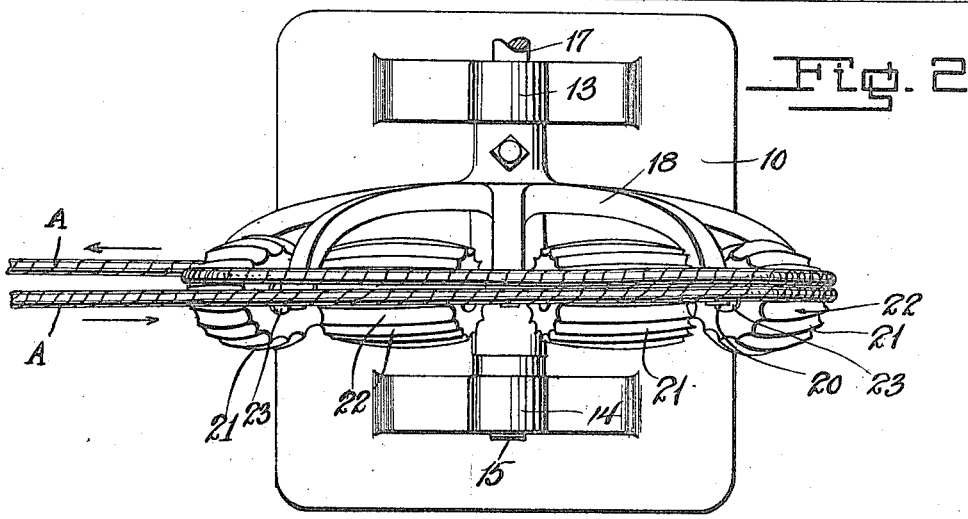
Fig. 2 is a top plan view of the pulley having a cable applied thereto.

Referring to these drawings, wherein like parts are designated by similar characters of reference throughout the several views, 10 designates a base of suitable form provided with transversely spaced-apart uprights 11 and 12. The uprights 11 and 12 are provided upon their upper ends with alining bearings 13 and 14, the latter of which support a rigid stud or arm 15 which projects inwardly toward the opposite bearing 13. The arm 15 carries upon its inner end a relatively large stationary worm 16, the thread of which recedes from the standard or post 12 and extends in a left-hand direction.

A shaft 17 is journaled through the bearing 13 and may have its inner end journaled in the central portion of the worm 16, at the free side thereof. Keyed to the shaft 17 is a spider 18 in the form of a hub portion provided with radially extending arms, the outer ends of which extend transversely and overlie the periphery of the worm 16. The arms of the spider may be of any desired number, and carry upon their outer ends a circumferential row of spindles 19. A spindle 19 is arranged between each two of the arms, and the spindles are oppositely reduced in thickness at their meeting ends and overlapped. Bolts 20 or the like are carried upon the outer ends of the arms of the spider 18 and engage through the overlapping ends of the spindles 19 to securely and rigidly hold the same upon the spider.

Each spindle 19 has freely mounted thereon a roller 21 provided in its periphery with equi-distantly spaced-apart grooves 22 which extend longitudinally of the rollers, and which are adapted to engage the thread of the worm 16. Preferably, the periphery of the roller 21 is tapered longitudinally, or reduced at its opposite ends by tapering the same, to conform the peripheries of the circumferential row of the rollers 21 to a circle concentric with the axis of the pulley. Washers or collars 23 are mounted on the spindles 19 and are held against the opposite ends of the rollers 21 by pins 24 or the like for centering the rollers 21 between each pair of the arms of the spider 18.

The flexible connecting or driving element A being shown in the present instance as in the form of a steel cable which is wound with one or more turns about the pulleys, and seated in the registering grooves 22 of the rollers 21. By providing the rollers 21 with a plurality of grooves, increased traction or friction is effected between the pulleys and the flexible element A.

In operation, when the cable A moves toward the top of the pulley, as shown in Fig. 3, it enters the registering grooves 22 in the rollers 21, and as the cable A is carried about the pulleys to the bottom thereof, the stationary worm 16 rotates the rollers 21 to advance the cable at the bottom of the pulleys transversely of the peripheries thereof a distance equal to one-half the distance between adjacent grooves 22 in the rollers. When the cable again reaches the top of the pulleys, the worm 16 has turned the rollers 21 sufficiently to space the cable laterally a distance equal to the distance between adjacent grooves of the rollers 21 so that the pulley is in position for receiving, constantly, the cable A as the latter is moved toward the pulley. In a like manner, as the cable may again be carried to the bottom of the pulley, it is displaced laterally one-half the distance between adjacent grooves of the rollers and may be taken off at that point, as shown in the drawings, or may be continued around the pulley any number of turns.

As the rollers 21 are constantly in contact with the stationary worm 16, the rollers are continuously turned upon their spindles 19 while the pulley is being operated, and the cable A is thus guided in a true spiral path around the periphery of the pulley and held from working endwise from the same.

The thread of the worm 16 extends in such a direction as to turn the rollers 21 to advance the cable A laterally from the point at which the cable first engages the pulley.

A pulley of this construction retains the cable A thereon and prevents the cable from sliding off the pulley; provides a relatively large friction or traction surface for engagement with the cable A; is provided with means for positively and accurately turning the peripheral or movable members, so as to advance the cable laterally as it is fed about the pulley; and provides a pulley about which the cable A may be wound one or more times as desired.

It is of course understood that various changes and modifications may be made in the details of construction of the above-specifically described embodiment of this invention without departing from the spirit thereof, and being restricted only by the scope of the following claims.

I claim:—

1. In a pulley, the combination of a plurality of peripherally disposed belt-engaging members, and means for actuating said members to move the belt transversely of the pulley.

2. In a pulley, the combination of a circumferential row of movable elements adapted for engagement with a belt, and means for moving said elements to move the belt transversely over the peripheral surface of the pulley.

3. In a pulley, the combination of a movable part, a plurality of belt-engaging members mounted in the periphery of the movable part, and a stationary part engaging said movable members for actuating the same upon the turning of the movable part to advance the belt transversely across the peripheral surface of the pulley.

4. In a pulley, the combination of a fixed worm wheel, a spider rotatably mounted at one side of the worm wheel, a plurality of rollers carried by the spider and arranged circumferentially about said worm wheel, said rollers being provided with longitudinal grooves therein adapted to mesh with said worm wheel, whereby said rollers are adapted to be turned by the worm wheel upon the rotation of the spider.

5. In a pulley, the combination of a fixed worm wheel, a rotating spider arranged adjacent to the worm wheel, a plurality of rollers mounted on the spider and arranged circumferentially around the worm wheel, said rollers having longitudinal grooves therein adapted to mesh with the worm wheel and adapted to receive a belt, said belt being adapted to be actuated to turn said rollers and spider, and said worm wheel being adapted to turn said rollers upon the spider to move the belt transversely of the pulley.

6. In a pulley, the combination of a fixed worm wheel, a spider rotatably mounted concentric with the worm wheel, said spider being provided with a plurality of radially extending spaced-apart arms, spindles secured across the outer ends of said arms, rollers mounted to turn on said spindles and arranged in a circumferential row about said worm wheel, said rollers being provided with longitudinally extending grooves adapted to receive therein a cable at the periphery of the pulley and adapted to mesh with said worm wheel, said cable being adapted to turn the spider, and said worm wheel being adapted to turn said rollers to advance the cable laterally as it passes around the pulley.

7. In a pulley, the combination of a fixed worm wheel, a shaft rotatably mounted concentric with the worm wheel, a spider fixed upon said shaft and having radially extending arms, a plurality of spindles carried by said arms in the plane of the worm wheel, and a plurality of rollers mounted on said spindles and having longitudinal grooves therein engaging the worm wheel, said rollers being adapted to receive a belt therein at the periphery of the pulley for turning the latter whereby said worm wheel is adapted to rotate the rollers and move the belt laterally across the peripheral surface of the pulley as the latter is rotated.

CLARENCE S. BERGQUIST.